United States Patent
Takano et al.

(10) Patent No.: US 9,971,447 B2
(45) Date of Patent: May 15, 2018

(54) ELECTRONIC APPARATUS AND COORDINATES DETECTION METHOD

(71) Applicant: PANASONIC INTELLECTUAL PROPERTY MANAGEMENT CO., LTD., Osaka (JP)

(72) Inventors: Tomoki Takano, Kanagawa (JP); Takeshi Yamaguchi, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days. days.

(21) Appl. No.: 15/354,493

(22) Filed: Nov. 17, 2016

(65) Prior Publication Data

US 2017/0308222 A1 Oct. 26, 2017

(30) Foreign Application Priority Data

Apr. 25, 2016 (JP) ................. 2016-086999

(51) Int. Cl.
*G06F 3/044* (2006.01)
*G06F 3/041* (2006.01)
*G02F 1/1333* (2006.01)

(52) U.S. Cl.
CPC ........ *G06F 3/0416* (2013.01); *G02F 1/13338* (2013.01); *G06F 3/044* (2013.01); *G06F 3/0412* (2013.01); *G02F 2201/50* (2013.01); *G06F 2203/04101* (2013.01); *G06F 2203/04105* (2013.01)

(58) Field of Classification Search
CPC ...... G06F 3/0416; G06F 3/0412; G06F 3/044; G06F 2203/04101; G06F 2203/04105; G02F 1/13338; G02F 2201/50
See application file for complete search history.

(56) References Cited

U.S. PATENT DOCUMENTS

| | | | |
|---|---|---|---|
| 2014/0168142 A1* | 6/2014 | Sasselli | G06F 3/0416 345/174 |
| 2015/0042610 A1 | 2/2015 | Takano et al. | |
| 2015/0309599 A1 | 10/2015 | Michihata et al. | |

(Continued)

FOREIGN PATENT DOCUMENTS

| | | |
|---|---|---|
| JP | 2010-272143 A | 12/2010 |
| JP | 2015-053033 A | 3/2015 |

(Continued)

*Primary Examiner* — Vinh T Lam
(74) *Attorney, Agent, or Firm* — McDermott Will & Emery LLP

(57) ABSTRACT

An electronic apparatus includes a display unit that displays information, a capacitive touch panel layer that transmits display of the display unit, and detects coordinates indicated by an indicator separated from a surface in a predetermined distance, a glass that protects the touch panel layer, and transmits the display of the display unit, a pressure sensor that detects distortion of the glass, and a control unit that validates and invalidates the coordinates detected by the touch panel layer. The control unit validates the coordinates detected by the touch panel layer in a case where the indicator is an active pen, and validates the coordinates most recently detected by the touch panel layer, when a predetermined amount of distortion is detected by the pressure sensor, in a case where the indicator is other than an active pen.

4 Claims, 16 Drawing Sheets

(56) References Cited

U.S. PATENT DOCUMENTS

| | | | |
|---|---|---|---|
| 2016/0170536 A1 | 6/2016 | Takano et al. | |
| 2016/0239136 A1* | 8/2016 | Kocak | G06F 3/0412 |
| 2016/0328067 A1* | 11/2016 | Aoki | G06F 3/0416 |
| 2016/0357391 A1* | 12/2016 | Nilo | G06F 3/0416 |
| 2017/0242290 A1* | 8/2017 | Jenkins | G02F 1/133385 |

FOREIGN PATENT DOCUMENTS

| | | |
|---|---|---|
| JP | 2015-135553 A | 7/2015 |
| JP | 2015-210620 A | 11/2015 |

* cited by examiner

FIG. 10

| i | D | P | T | X | Y | Z |
|---|---|---|---|---|---|---|
| 1 | 3 | 1 | 5s | 100 | 200 | 100 |
| 2 | 2 | 2 | 2s | 200 | 300 | 100 |
| 3 | 3 | 1 | 1s | 300 | 100 | 100 |
| 4 | 0 | 0 | 0 | 0 | 0 | 0 |
| 5 | 0 | 0 | 0 | 0 | 0 | 0 |
| 6 | 0 | 0 | 0 | 0 | 0 | 0 |
| 7 | 0 | 0 | 0 | 0 | 0 | 0 |
| 8 | 0 | 0 | 0 | 0 | 0 | 0 |
| 9 | 0 | 0 | 0 | 0 | 0 | 0 |
| 10 | 0 | 0 | 0 | 0 | 0 | 0 |

ELECTRONIC APPARATUS AND COORDINATES DETECTION METHOD

RELATED APPLICATIONS

This application claims the benefit of Japanese Application No. 2016-086999, filed on Apr. 25, 2016, the disclosure of which Application is incorporated by reference herein.

BACKGROUND

1. Technical Field

The present disclosure relates to an electronic apparatus on which a touch panel is mounted and a coordinates detection method.

2. Description of the Related Art

An electronic apparatus on which a touch panel is mounted such as a smartphone, a tablet, and the like is spread. However, in such an electronic apparatus, there is also provided an apparatus with a capacitive touch panel. The capacitive touch panel can receive not only a "touch operation" which is performed by a finger of a bare hand or a pointing device (object having conductivity) directly being in contact with a surface thereof, but also a "hover operation" which is performed by the finger at a predetermined height from the surface thereof without the finger of the bare hand being in contact with the surface of the touch panel. With this, users can perform an operation by using not only the bare hand or the pointing device, but also a gloved finger.

For example, as the pointing device, an active stylus pen (hereinafter, referred to as active pen) that performs communication with a touch panel is known (for example, see Japanese Patent Unexamined Publication No. 2015-210620). However, in the capacitive touch panel, there is a possibility that malfunction occurs when a conductor such as water droplets and the like is attached on a surface thereof. Therefore, it is unlikely that the capacitive touch panel is used in rainy weather.

To solve the problem, in a case where a plurality of coordinates on the touch panel are detected, and a predetermined amount of distortion is detected on a transparent member protecting the touch panel, there is a technology that most recently detected coordinates are validated within a predetermined time in which a detection time of the distortion is set as a reference.

According to the technology, for example, in a state where water droplets or the like are continuously attached on the touch panel in rainy weather or the like, it is possible to more reliably perform the operation by the hand and gloves, and accurately prevent erroneous detection that attachment of the water droplets is detected as an operation.

SUMMARY

However, in a case where the active pen is used in the technology, since the load of an operation by the active pen is very light, there are problems that distortion of the transparent member is hardly detected and operability is reduced.

An object of the disclosure is to provide an electronic apparatus and a coordinates detection method capable of preventing generation of an erroneous operation due to water droplets or the like and reduction of the operability of an active pen.

According to the disclosure, there is provided an electronic apparatus including a housing; a display unit that is disposed inside the housing, and displays predetermined information; a capacitive touch panel unit that transmits display of the display unit, and detects coordinates indicated by an indicator separated from a surface in a predetermined distance; a transparent member that protects the touch panel unit, and transmits the display of the display unit; a pressure detection unit that detects distortion of the transparent member; and a control unit that validates or invalidates the coordinates detected by the touch panel unit, in which the control unit validates the coordinates detected by the touch panel unit, in a case where the indicator is an active pen, and the control unit validates the coordinates most recently detected by the touch panel unit when distortion of a predetermined amount is detected by the pressure detection unit in a case where the indicator is other than an active pen.

According to the disclosure, there is provided a coordinates detection method which is used in an electronic apparatus including a housing, a display unit that is disposed inside the housing, and displays predetermined information, a capacitive touch panel unit that transmits display of the display unit, and detects coordinates indicated by an indicator separated from a surface in a predetermined distance, a transparent member that protects the touch panel unit, and transmits the display of the display unit, a pressure detection unit that detects distortion of the transparent member, and a control unit that validates or invalidates the coordinates detected by the touch panel unit, the method including validating the coordinates detected by the touch panel unit in a case where the indicator is an active pen; and validating the coordinates most recently detected by the touch panel unit, when a predetermined amount of distortion is detected by the pressure detection unit, in a case where the indicator is other than an active pen.

According to the disclosure, it is possible to prevent generation of an erroneous operation due to water droplets or the like and reduction of operability of the active pen.

BRIEF DESCRIPTION OF THE DRAWINGS

FIG. 10 is a diagram illustrating an example of a coordinates management table according to the embodiment;

DETAILED DESCRIPTION

Hereinafter, an embodiment will be described with reference to the drawings.

Figure 1:
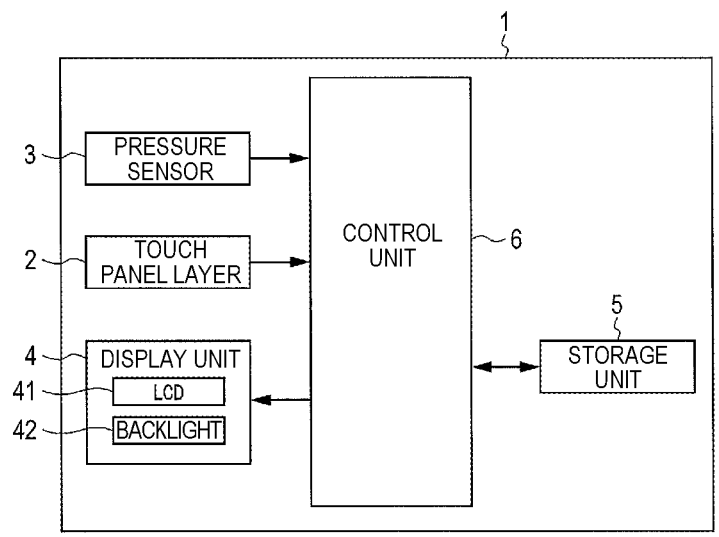
FIG. 1 is a block diagram illustrating an example of a schematic configuration of an electronic apparatus according to an embodiment.

First, with reference to FIG. 1, electronic apparatus 1 according to the embodiment will be described. FIG. 1 is a block diagram illustrating an example of a schematic configuration of electronic apparatus 1 according to the embodiment.

In FIG. 1, electronic apparatus 1 includes touch panel layer 2, pressure sensor 3, display unit 4, storage unit 5, and control unit 6. For example, as electronic apparatus 1, a smartphone, a tablet, or the like is mentioned.

Touch panel layer 2 (an example of part of touch panel unit) transmits display of display unit 4. In addition, touch panel layer 2 adopts a capacitive type, and can accept not only a touch operation but also a hover operation. The touch operation means an operation which is performed by directly touching a touch panel surface (surface of touch panel layer 2) with an indicator. Meanwhile, the hover operation means an operation which is performed at a location spaced from a surface thereof in a predetermined distance without directly touching a touch panel surface with the indicator. As an example of the hover operation, an operation in which the touch panel surface is touched by a gloved finger is mentioned. The touch panel surface means a surface receiving the operation of user in touch panel layer 2.

For example, as the indicator, a finger of a human being (for example, bare hand and gloved finger), an object (for example, stylus pen) having the conductivity, or the like is mentioned. As the stylus pen, for example, an active pen (also referred to as digitizer) and a passive pen are mentioned.

The active pen may be any one of an electrostatic type, an electromagnetic induction type, and an optical type. In addition, the active pen may be a pen which directly communicates with touch panel layer 2, and may be connected to touch panel layer 2 in the Bluetooth (registered trademark). In addition, the active pen may be a writing pressure detection pen, and may be a writing pressure non-detection pen. In addition, the active pen may be a hover operation detection pen, and may be a hover operation non-detection pen. In addition, the active pen may be also a battery type pen, a charge type pen, or a non-battery type pen.

In addition, the active pen may be also a type capable of being recognized as the finger, and a type capable of being recognized as the active pen. In the latter type, since a signal indicating that it is the active pen to touch panel layer 2 is transmitted, it is possible for touch panel layer 2 to distinguish the active pen and other indicators (finger of bare hand, gloved finger, passive pen, water droplets, or the like) based on the signal.

Figure 2:
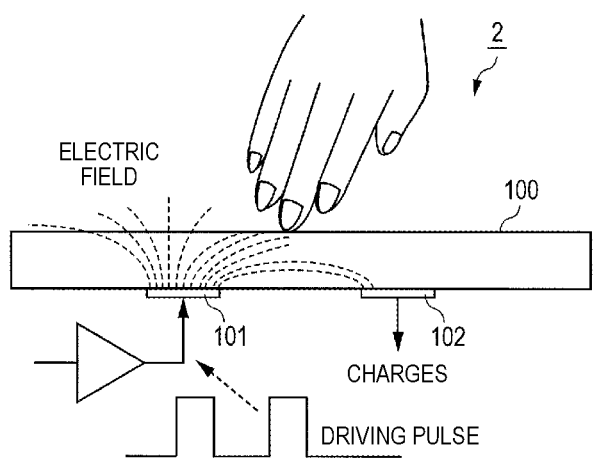
FIG. 2 is a diagram illustrating an example of a schematic configuration of a touch panel layer according to the embodiment.

Touch panel layer 2 includes transmission electrode 101 and reception electrode 102, is disposed to be separated from the bottom surface of plate shape dielectric 100, as illustrated in FIG. 2. A driving pulse based on a transmission signal is applied to transmission electrode 101. In a case where an electric field is generated from transmission electrode 101 by applying the driving pulse to transmission electrode 101 and a finger is input to the field, the number of electric force lines between transmission electrode 101 and reception electrode 102 decreases and the change of the number appears as change of charges in reception electrode 102.

Accordingly, touch panel layer 2 detects the number of indicators (for example, the number of fingers), two-dimensional coordinates (x, y) in display unit 4 designated by the indicator, and vertical distance (z) between the touch panel surface and the finger, based on a reception signal in response to the change of the charges in reception electrode 102. Detection processing described here is performed in a touch panel control unit (not illustrated) included in touch panel layer 2. Accordingly, touch panel layer 2 outputs information (hereinafter, referred to as coordinates information) indicating the number of indicators, the two-dimensional coordinates, and the vertical distance to control unit 6.

In addition, in a case where a signal indicating that the indicator is the active pen is received from the active pen, touch panel layer 2 outputs the information indicating the fact by causing the information to be included in the coordinates information to control unit 6.

Figure 3:
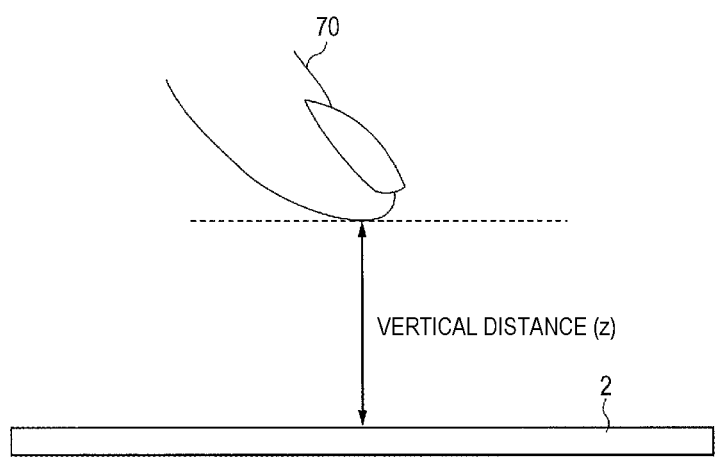
FIG. 3 is a diagram illustrating an example of a positional relationship of the touch panel layer and a finger in the electronic apparatus according to the embodiment.

Vertical distance (z) means a distance between the touch panel surface of touch panel layer 2 and finger 70, as illustrated in FIG. 3. Finger 70 is a finger of the bare hand. In a case where vertical distance (z) is equal to or less than a predetermined value, touch panel layer 2 can detect two-dimensional coordinates (x, y). Although illustration is omitted in FIG. 3, glass 11 (see FIG. 6 or the like, an example of transparent member) for protecting touch panel layer 2 is provided on the touch panel surface. Glass 11 transmits display of display unit 4.

Pressure sensor 3 (an example of pressure detection unit) detects distortion of glass 11, and outputs a signal (hereinafter, referred to as distortion amount information) indicating an amount of the detected distortion to control unit 6. The distortion of glass 11 is generated by the pressure of the indicator, and is not generated by the attachment of water droplets or the like.

Figure 4:
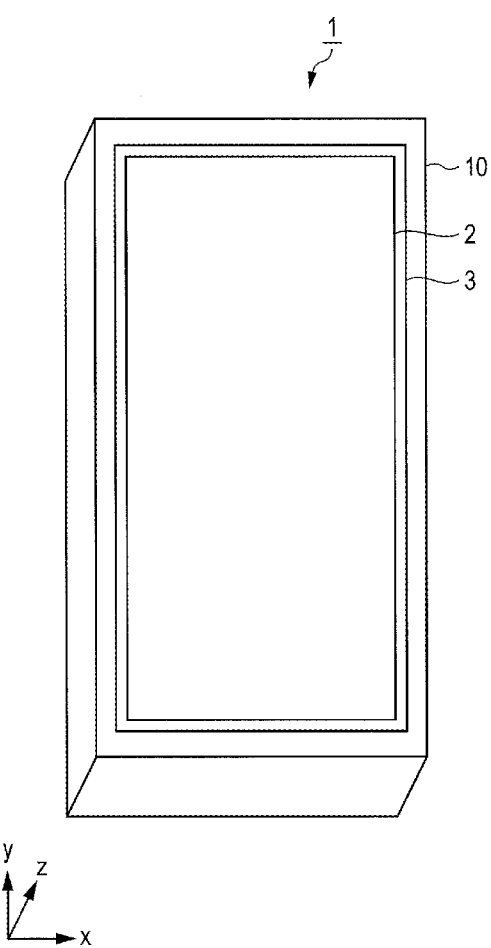
FIG. 4 is a perspective view illustrating an example of an appearance of a front surface of the electronic apparatus according to the embodiment.
Figure 14:
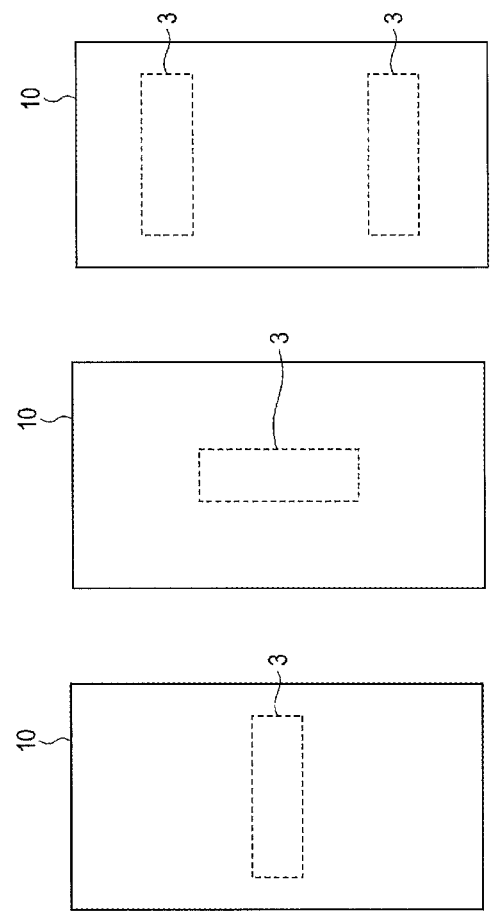
FIG. 14A is a diagram illustrating a Disposition Example of the pressure sensor in the electronic apparatus according to the embodiment.
FIG. 14B is a diagram illustrating a Disposition Example of the pressure sensor in the electronic apparatus according to the embodiment.
FIG. 14C is a diagram illustrating a Disposition Example of the pressure sensor in the electronic apparatus according to the embodiment.

Here, a disposition of touch panel layer 2 and pressure sensor 3 will be described. As illustrated in FIG. 4, electronic apparatus 1 includes rectangular shape housing 10. In FIG. 4, touch panel layer 2 and pressure sensor 3 are disposed in a front surface side of housing 10. Touch panel layer 2 and pressure sensor 3 are formed in a vertical rectangular shape (rectangular) in a plan view, and an area thereof is smaller than that of the front surface of housing 10. In FIG. 4, although the area of pressure sensor 3 is formed slightly larger than that of touch panel layer 2, the area of pressure sensor 3 may be smaller than that of touch panel layer 2 (see FIG. 14). Accordingly, touch panel layer 2 is disposed to overlap pressure sensor 3 so as to be formed in a front surface side more than pressure sensor 3.

Although illustration is omitted in FIG. 4, glass 11 for protecting touch panel layer 2 is provided in the front surface side (that is, touch panel surface) of touch panel layer 2, as described above. In addition, in pressure sensor 3, display unit 4 that is the vertical rectangular shape in a plan view is disposed on a rear surface of a surface on which touch panel layer 2 is overlapped.

Display unit 4 is disposed inside housing 10, is a device that displays predetermined information based on an instruction of control unit 6, and includes liquid crystal display (LCD) 41 and backlight 42. Display unit 4 may be also configured to include a device such as an organic electroluminescence (EL), an electronic paper, or the like, instead of LCD 41.

Figure 5A:
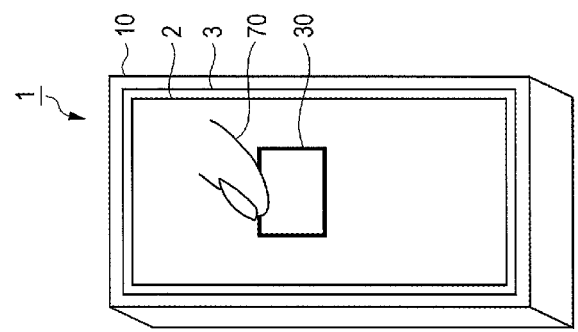
FIG. 5A is a diagram illustrating an example of an icon display in the electronic apparatus according to the embodiment.

Display unit 4 displays a predetermined image (for example pointer, icon, or the like), as display corresponding to two-dimensional coordinates (x, y) detected by touch panel layer 2. For example, as illustrated in FIG. 5A, in a case where two-dimensional coordinates ($x_1$, $y_1$) are valid coordinates, icon 30 is displayed, as illustrated in FIG. 5B.

Figure 5B:
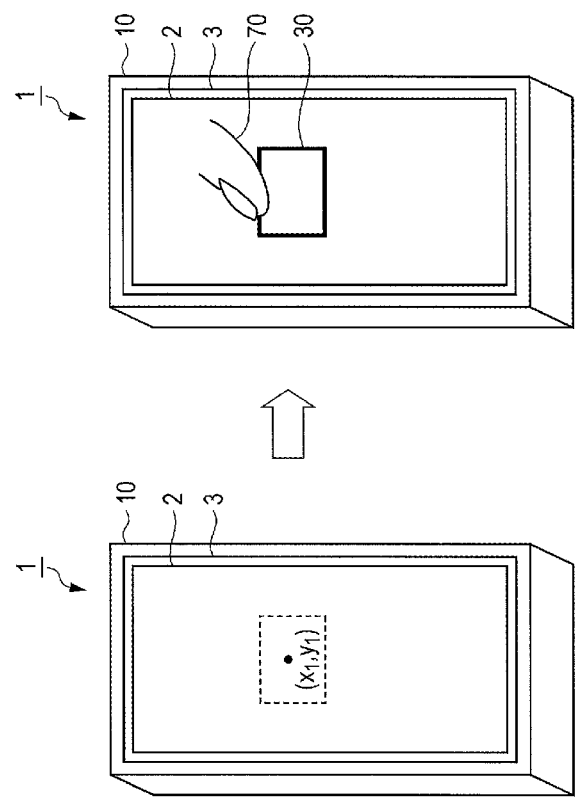
FIG. 5B is a diagram illustrating an example of the icon display in the electronic apparatus according to the embodiment.

In FIG. 5B, the pointer may be displayed by being corresponded to two-dimensional coordinates (x, y). In this case, when the pointer is overlapped with the icon, the icon may be a selectable state. Furthermore, when finger 70 approaches touch panel layer 2 at equal to or less than predetermined vertical distance (z) (including zero), a function corresponding to the icon may be also activated. The display of such a pointer or an icon and the activation of the function corresponding to the icon are performed by an instruction of control unit 6.

Figure 6:
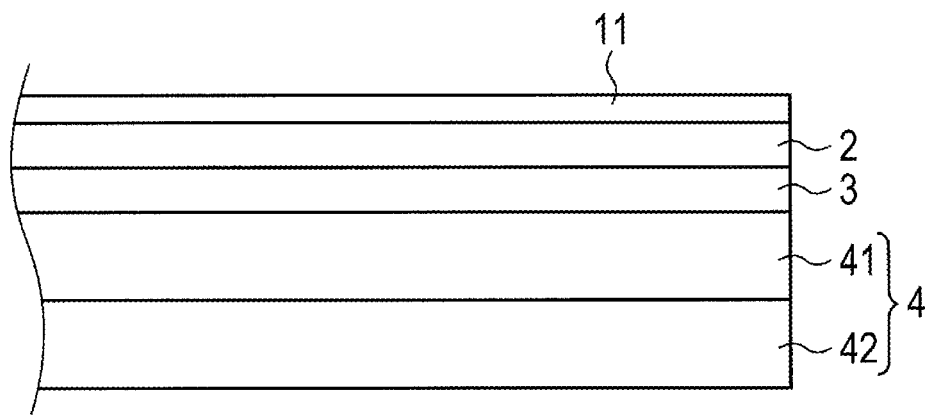
FIG. 6 is a side sectional view illustrating Disposition Example 1 of a glass, the touch panel layer, a pressure sensor, and a display unit in the electronic apparatus according to the embodiment.

Here, in electronic apparatus 1, Disposition Example 1 of touch panel layer 2, pressure sensor 3, and display unit 4 will be described. In FIG. 6, as described above, in the front surface side of touch panel layer 2, glass 11 is disposed by being overlapped to protect touch panel layer 2. Glass 11 and touch panel layer 2 are planar, have a predetermined transmittance in a visible light, and transmit the display of display unit 4. In addition, at least a part of glass 11 is disposed to be exposed from housing 10, and other part thereof is disposed inside housing 10. Glass 11 may be a configuration integrated with touch panel layer 2.

In addition, in FIG. 6, pressure sensor 3 is disposed on a rear surface of a surface on which glass 11 is overlapped on touch panel layer 2, as described above. In addition, as described above, in pressure sensor 3, LCD 41 and backlight 42 constituting display unit 4 are sequentially disposed on the rear surface of the surface on which touch panel layer 2 is overlapped. As described above, since pressure sensor 3 is disposed by being overlapped on the front surface side of display unit 4, it is required that pressure sensor 3 is transparent or has transparency which transmits the visible light, similar to glass 11 and touch panel layer 2. Pressure sensor 3 may be integrally configured with touch panel layer 2.

A disposition order of touch panel layer 2 and pressure sensor 3 illustrated in FIG. 6 may be implemented in reverse. That is, as illustrated in FIG. 7, pressure sensor 3 may be disposed between glass 11 and touch panel layer 2.

Figure 7:
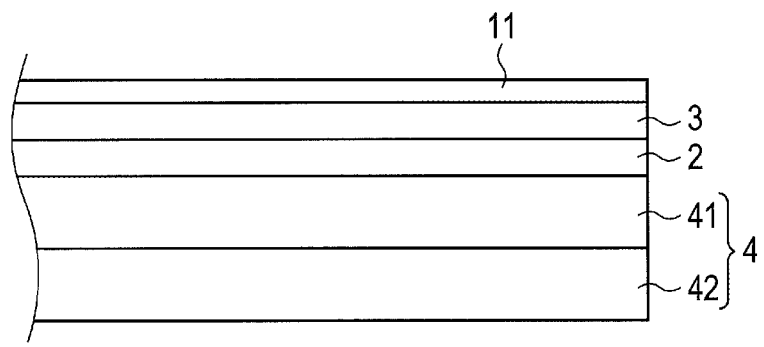
FIG. 7 is a side sectional view illustrating a modification example of Disposition Example 1 of the glass, the touch panel layer, the pressure sensor, and the display unit in the electronic apparatus according to the embodiment.

In addition, in electronic apparatus 1, the disposition order of touch panel layer 2, pressure sensor 3, and display unit 4 is not limited to the example illustrated in FIG. 6 and FIG. 7. Other examples (Disposition Examples 2 to 10) will be described below.

Returning to the description of FIG. 1. Storage unit 5 includes a non-volatile memory such as a dynamic random access memory (DRAM) and the like, and stores a setting when users perform various settings with respect to electronic apparatus 1. In addition, for example, storage unit 5 stores a coordinates management table (see FIG. 10) described below.

Control unit 6 controls each part of electronic apparatus 1, is configured with a central processing unit (CPU), a read only memory (ROM), a random access memory (RAM), and an interface circuit. Programs for controlling the CPU are stored in the ROM, and the RAM is used as an operational area at the time of operating the CPU.

Control unit 6 receives the distortion amount information from pressure sensor 3, and receives the coordinates information from touch panel layer 2. Accordingly, control unit 6 performs a processing operation (for example, see FIG. 8, FIG. 11, and FIG. 12) described below, based on the distortion amount information or the coordinates information.

So far, the configuration of electronic apparatus 1 according to the embodiment is described.

Next, with reference to FIG. 8, a specific example of coordinates determination processing performed by control unit 6 will be described. The coordinates determination processing is processing for determining whether two-dimensional coordinates indicated by the coordinates information is valid or invalid. Here, water droplets are described as an example. However, the embodiment is not limited to water, and the same is also applied to liquid droplets of liquid having a predetermined conductivity.

Figure 8A:
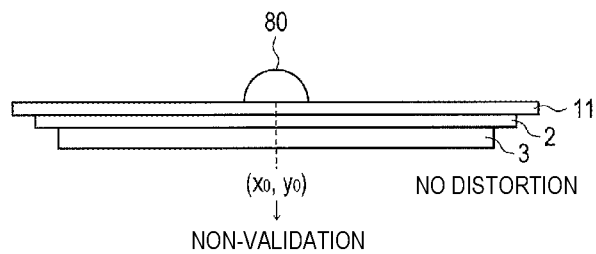
FIG. 8A is a diagram illustrating an example of coordinates determination at the time of detecting water and/or a finger on the touch panel layer in the electronic apparatus according to the embodiment.

As illustrated in FIG. 8A, water droplet 80 due to the rain is attached on glass 11. At this time, touch panel layer 2 outputs the coordinates information indicating two-dimensional coordinates $(x_0, y_0)$ of a location on which water droplet 80 is attached to control unit 6. In addition, pressure sensor 3 outputs the distortion amount information indicating the fact that the amount of distortion of glass 11 is zero to control unit 6. Control unit 6 receives the distortion amount information indicating the fact that the amount of distortion is zero and does not validate two-dimensional coordinates $(x_0, y_0)$ indicated by the coordinates information. The validation means that the coordinates are referred to as the valid coordinates. Accordingly, processing (for example, display or the like of information in display unit 4) corresponding to two-dimensional coordinates $(x_0, y_0)$ is not performed.

Figure 8B:
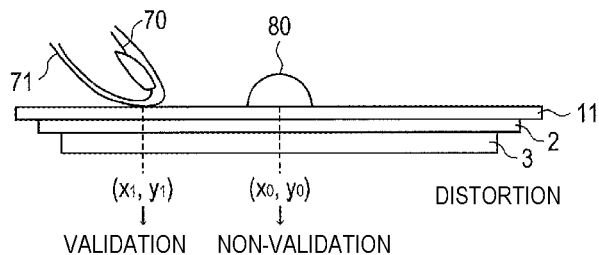
FIG. 8B is a diagram illustrating an example of the coordinates determination at the time of detecting water and/or a finger on the touch panel layer in the electronic apparatus according to the embodiment.

As illustrated in FIG. 8A, in a state where water droplet 80 is attached on glass 11, a user touches glass 11 with finger 70 in glove 71 such that the hover operation is performed as illustrated in FIG. 8B. At this time, touch panel layer 2 outputs the coordinates information indicating two-dimensional coordinates $(x_1, y_1)$ of the location being in contact with glove 71 to control unit 6, in addition to two-dimensional coordinates $(x_0, y_0)$ being outputted. In addition, pressure sensor 3 outputs the distortion amount information indicating the amount of distortion generated in glass 11 by the pressure of glove 71 to control unit 6. Control unit 6 validates only (the most recently detected) two-dimensional coordinates $(x_1, y_1)$ received after a time, in a case where the amount of distortion indicated in the distortion amount information exceeds a predetermined valid amount of distortion. Accordingly, processing corresponding to two-dimensional coordinates $(x_1, y_1)$ is performed.

By doing so, in a state where a conductor such as water droplet and the like is continuously attached on the touch panel, two-dimensional coordinates immediately before (last) the detection of pressure by the operation by the bare hand and the glove is validated and previous two-dimensional coordinates thereof are not validated, thereby it is possible to further reliably perform the operation of the bare hand and the glove having a high possibility that it is done immediately before the pressure, and to further prevent erroneous detection that attachment of water droplets having a high possibility that it is before the operation is an operation.

Figure 8C:
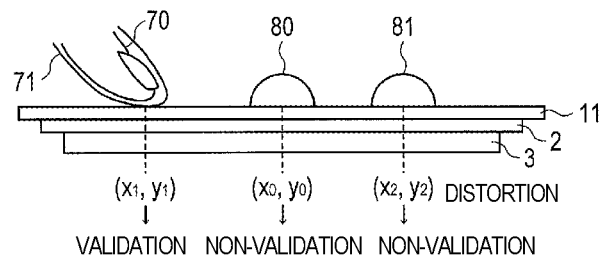
FIG. 8C is a diagram illustrating an example of the coordinates determination at the time of detecting water and/or a finger on the touch panel layer in the electronic apparatus according to the embodiment.

As illustrated in FIG. 8B, in a state where water droplet 80 is attached on glass 11, and the hover operation is performed by the user touching glass 11 with finger 70 in glove 71 water droplet 81 is attached on glass 11, as illustrated in FIG. 8C. At this time, touch panel layer 2 outputs the coordinates information indicating two-dimensional coordinates $(x_2, y_2)$ of a location on which water droplet 81 is attached to control unit 6, in addition to the coordinates information indicating two-dimensional coordinates $(x_0, y_0)$ and $(x_1, y_1)$ being outputted. At this time, as described above, pressure sensor 3 is outputting the distortion amount information indicating the amount of distortion generated by pressing of glove 71 to control unit 6. Although control unit 6 receives the distortion amount information, since two-dimensional coordinates $(x_1, y_1)$ are already validated, control unit 6 does not validate two-dimensional coordinates $(x_2, y_2)$ indicated in the coordinates information that is received after a time. Accordingly, although processing corresponding to two-dimensional coordinates $(x_1, y_1)$ is performed, processing corresponding to two-dimensional coordinates $(x_2, y_2)$ is not performed. As described above, in a case where validated two-dimensional coordinates already exist, even if pressure sensor 3 detects that there is distortion, control unit 6 does not perform the validation of new two-dimensional coordinates.

By doing so, in a case where the validation is continued in a state where the conductor such as water droplet and the like is continuously attached on the touch panel, since two-dimensional coordinates determined after the validation are not validated, it is possible to prevent erroneous detection that the attachment of water droplet after the validation is an operation.

In FIG. 8, two-dimensional coordinates by the attachment of water droplets 80 and 81 and the contact of glove 71 may be also coordinates in a stop state or in a movement state. In addition, control unit 6 continues the validation until release is detected with respect to the two-dimensional coordinates that are validated once. The release means that a value of vertical distance (z) becomes a value equal to or greater than a predetermined value by separating the indicator from touch panel layer 2. For example, control unit 6 detects the release in a case where vertical distance (z) indicated in the coordinates information received from touch panel layer 2 is equal to or greater than a predetermined value. In the ongoing of the validation of the two-dimensional coordinates, the distortion amount information output to control unit 6 from pressure sensor 3 may be information indicating a fact that the distortion is zero, and may be also information indicating the amount of distortion greater than zero.

As described above, control unit 6 continues the validation of the two-dimensional coordinates during vertical distance (z) detected by touch panel layer 2 is smaller than a predetermined distance. That is, in a case where vertical distance (z) is greater than the predetermined distance, control unit 6 stops the validation. With this, it is possible to stop the validation, regardless of the output of pressure sensor 3.

In a case where a user performs a long-press operation or a flick operation by an indicator (for example, finger), there is a case where pressure with respect to touch panel layer 2 gradually decreases at the time of terminating the operation. In this case, it is unlikely that termination of the operation is determined by only the output of pressure sensor 3 which is not good at detecting a gradual change of the pressure. However, as described above, since control unit 6 stops the validation regardless of the output of pressure sensor 3, it is possible to appropriately determine the termination of the operation.

So far, the specific example of the coordinates determination processing is described. The example of the coordinates determination processing is not limited thereto.

Figure 9:
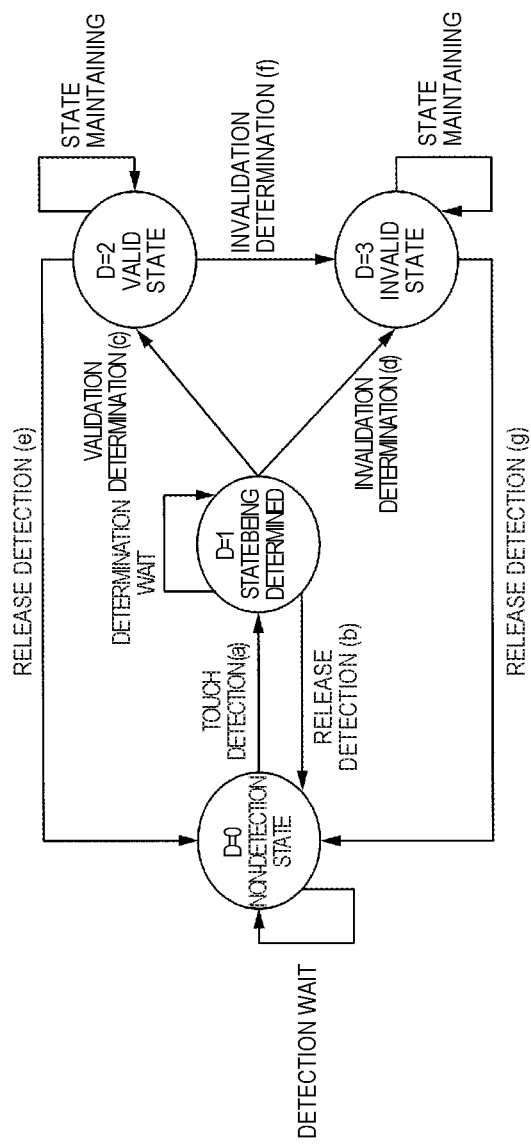
FIG. 9 is a diagram illustrating a transition example of a coordinates detection state according to the embodiment.

Next, with reference to FIG. 9, a detection state of coordinates will be described. FIG. 9 is a diagram illustrating a transition example of a detection state of the coordinates.

As illustrated in FIG. 9, as detection state of coordinates (D), there are four types of non-detection state (0), state being determined (1), valid state (2), and invalid state (3).

Non-detection state is a state where touch panel layer 2 does not detect the two-dimensional coordinates. Touch panel layer 2 detects the two-dimensional coordinates by receiving the touch operation or the hover operation at the time of the non-detection state, and the detection state of coordinates transitions from the non-detection state to the state being determined in a case where the coordinates information is output to control unit 6 (a in the figure). Accordingly, control unit 6 recognizes that the detection state of coordinates is in the state being determined (D=1).

The state being determined is a state where control unit 6 is performing the coordinates determination processing. In a case where control unit 6 determines that the two-dimensional coordinates are valid at the time of the state being determined (c in the figure), the detection state of coordinates transitions from the state being determined to the valid state. Accordingly, control unit 6 recognizes that the detection state of coordinates is in the valid state (D=2).

Meanwhile, in a case where control unit 6 determines that two-dimensional coordinates are invalid at the time of the state being determined (d in the figure), the detection state of coordinates transitions from the state being determined to the invalid state. Accordingly, control unit 6 recognizes that the detection state of coordinates is in the invalid state (D=3).

In addition, in a case where control unit 6 detects the release of the indicator at the time of the state being determined, the detection state of coordinates transitions from the state being determined to the non-detection state (b in the figure). Accordingly, control unit 6 recognizes that the detection state of coordinates is in the non-detection state (D=0).

Here, furthermore, a specific example of the coordinates determination processing will be described.

For example, in the state being determined, in a case where the indicator is the active pen (for example, case where information indicating that indicator is active pen is included in coordinates information from touch panel layer 2), control unit 6 determines that two-dimensional coordinates indicated in the coordinates information are valid.

In addition, for example, in the state being determined, in cases where there is no two-dimensional coordinates determined to be valid, the indicator is other than an active pen (for example, information indicating that indicator is active pen is not included in coordinates information from touch panel layer 2), and the distortion amount information indicating the amount of distortion that exceeds a valid amount of distortion is received from pressure sensor 3 within a predetermined time after detecting the indicator, control unit 6 determines that two-dimensional coordinates indicated in the coordinates information are valid.

Meanwhile, for example, in the state being determined, in a case where the two-dimensional coordinates that are determined to be valid exist, control unit 6 determines that the two-dimensional coordinates are invalid.

In addition, for example, in the state being determined, in a case where the two-dimensional coordinates exist in a state where a predetermined time has elapsed without being validated after the detection, control unit 6 determines that the existed two-dimensional coordinates are invalid.

In addition, for example, when two-dimensional coordinates indicated by an indicator other than the active pen are valid in the valid state described below, in a case where the two-dimensional coordinates indicated by the active pen are detected, control unit 6 determines that the two-dimensional coordinates that have been validated is invalid.

So far, a specific example of the coordinates determination processing is described. Returning to the description of FIG. 9.

The valid state is a state in which two-dimensional coordinates are valid. In a case where control unit 6 detects the release of the indicator at the time of the valid state (e in the figure), the detection state of coordinates transitions from the valid state to the non-detection state. Accordingly, control unit 6 recognizes that the detection state of coordinates is in the non-detection state (D=0).

In addition, in a case where control unit 6 determines that two-dimensional coordinates are invalid at the time of the valid state (f in the figure), the detection state of coordinates transitions from the valid state to the invalid state. Accordingly, control unit 6 recognizes that the detection state of coordinates is in the invalid state (D=3).

The invalid state is a state in which the two-dimensional coordinates are invalid. In a case where control unit 6 detects the release of the indicator at the time of the invalid state (g in the figure), the detection state of coordinates transitions from the invalid state to the non-detection state. Accordingly, control unit 6 recognizes that the detection state of coordinates is in the non-detection state (D=0).

So far, the detection state of coordinates is described.

Next, a detection state of the indicator will be described.

As detection state (P) of the indicator, there are three types of non-detection state (0), detection state (1) other than the active pen, and active pen detection state (2).

Non-detection state (0) is a state in which the indicator is not detected. Detection state (1) other than the active pen is a state where an indicator (for example, finger of bare hand, gloved finger, passive pen, water droplet, or the like) other than the active pen is detected as the indicator. Active pen detection state (2) is a state where the active pen is detected as the indicator.

For example, in a case where the coordinates information is not received from touch panel layer 2, control unit 6 recognizes that the detection state of indicator is in the non-detection state (P=0). In addition, for example, in a case where the information indicating that the indicator is the active pen is not included in the coordinates information received from touch panel layer 2, control unit 6 recognizes that the detection state of indicator is in the detection state other than the active pen (P=1). In addition, for example, in a case where the information indicating that the indicator is the active pen is included in the coordinates information received from touch panel layer 2, control unit 6 recognizes that the detection state of indicator is in the active pen detection state (P=2).

So far, the detection state of indicator is described.

As described above, the detection state of coordinates (D) and detection state (P) of indicator which are recognized as described above are recorded in a coordinates management table by control unit 6. FIG. 10 is a diagram illustrating an example of the coordinates management table. For example, the coordinates management table is stored in storage unit 5.

In FIG. 10, i is a serial number of the two-dimensional coordinates of a management target. Here, as examples, 1 to 10 are represented. In the coordinates management table, D, P, T, X, Y, and Z described below are recorded for each of the serial number.

In addition, in FIG. 10, D is a detection state of the coordinates recognized by control unit 6, and P is a detection state of the indicator recognized by control unit 6.

In addition, in FIG. 10, T is a time (hereinafter, referred to as elapsed time after detection) which has elapsed from the detection of the two-dimensional coordinates. Unit of the elapsed time after detection, for example, is seconds (s). For example, in a case where the two-dimensional coordinates indicated in the coordinates information received from touch panel layer 2 are coordinates that are first detected, control unit 6 starts counting of the elapsed time after the detection.

By the start of the counting, a value of T illustrated in FIG. 10 is updated from time to time.

In addition, in FIG. 10, X is an x coordinate of the two-dimensional coordinates indicated in the coordinates information received by control unit 6. Y is a y coordinate of the two-dimensional coordinates indicated in the coordinates information received by control unit 6. Z is vertical distance (z) indicated in the coordinates information received by control unit 6.

So far, the example of the coordinates management table is described.

Figure 11:
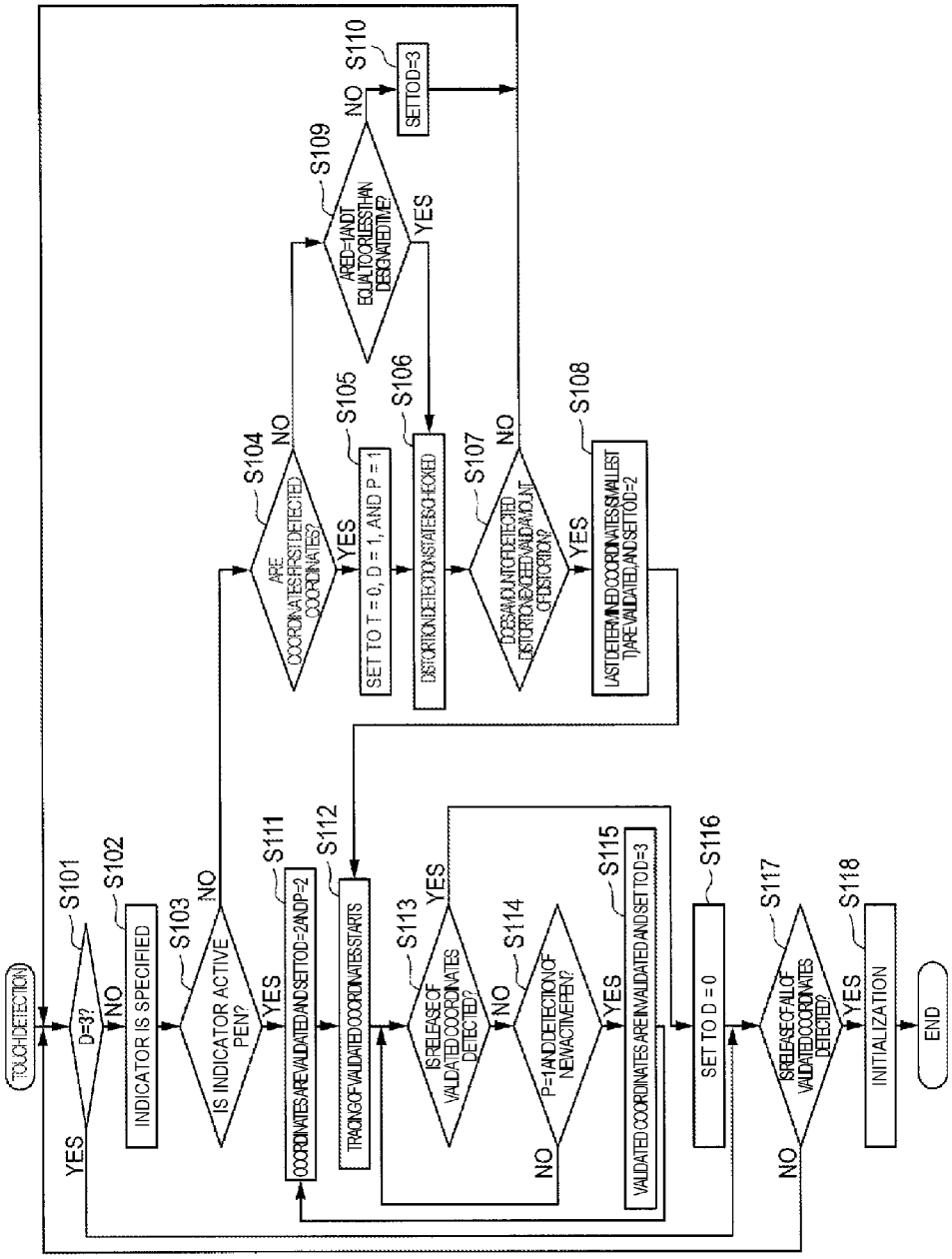
FIG. 11 is a flowchart illustrating an operation example of the electronic apparatus according to the embodiment.

Next, an operation example of electronic apparatus 1 will be described by using FIG. 11. FIG. 11 is a flowchart illustrating an operation example of electronic apparatus 1.

For example, the operation example is performed by being corresponded to each of i's=1 to 10. However, it is not necessary that it is performed according to the order of 1 to 10. In addition, the operation example starts, in a case where the touch operation or the hover operation on touch panel layer 2 is detected, and control unit 6 receives the coordinates information from touch panel layer 2.

First, control unit 6 determines whether or not the detection state of coordinates is in the invalid state (D=3) (step S101). In a case of D=3 (step S101: YES), the flow proceeds to step S117 described below.

Meanwhile, in a case where it is not D=3 (step S101: NO), control unit 6 specifies the indicator (step S102). Here, as an example, control unit 6 specifies whether the indicator is the active pen or is other than an active pen.

For example, if the information indicating that the indicator is the active pen is included in the coordinates information, control unit 6 determines that the indicator is the active pen (step S103: YES). In this case, the flow proceeds to step S111 described below.

Meanwhile, for example, if the information indicating that the indicator is the active pen is not included in the coordinates information, control unit 6 determines that the indicator is other than an active pen (step S103: NO). In this case, the flow proceeds to step S104.

In a case where the indicator is other than an active pen (step S103: NO), control unit 6 determines whether or not the two-dimensional coordinates (hereinafter, simply referred to as "coordinates") indicated in the coordinates information are the first detected coordinates (step S104). In other words, control unit 6 determines whether or not the coordinates indicated in the coordinates information are in the non-detection state (D=0).

As a determination result of step S104, in a case where the coordinates are not the first detected coordinates (step S104: NO), the flow proceeds to step S109 described below. As the determination result of step S104, in a case where the coordinates are the first detected coordinates (step S104: YES), control unit 6 sets an elapsed time after detection to zero (T=0), the detection state of coordinates to state being determined (D=1), and the detection state of indicator to detection state (P=1) other than the active pen (step S105). Each set value is recorded in the coordinates management table (hereinafter, the same). In addition, control unit 6 starts counting of elapsed time after detection T. The counted value is also recorded in the coordinates management table.

Next, control unit 6 checks a distortion detection state (amount of distortion of glass 11 detected by pressure sensor 3) indicated in the distortion amount information (step S106).

As a check result of step S106, in a case where the amount of distortion detected by pressure sensor 3 does not exceed a valid amount of distortion (step S107: NO), the flow returns to step S101.

Meanwhile, as the check result of step S106, in a case where the amount of distortion detected by pressure sensor 3 exceeds a valid amount of distortion (step S107: YES), control unit 6 validates the last determined coordinates, and sets the detection state of coordinates to the valid state (D=2) (step S108). Then, the flow proceeds to step S112 described below. In other words, the "last determined coordinates" mean coordinates in which elapsed time after detection T is the smallest or the coordinates most recently detected by touch panel layer 2.

As the determination result of step S104, in a case where the coordinates are not the first detected coordinates (step S104: NO), control unit 6 determines whether or not the detection state of coordinates is in state being determined (D=1), and elapsed time after detection T is equal to or less than a designated time (for example, 1 to 2 seconds) that is set in advance (step S109).

As a determination result of step S109, in a case where D=1 and elapsed time after detection T is equal to or less than a designated time (step S109: YES), the flow proceeds to step S106.

As the determination result of step S109, in a case where D=1 and elapsed time after detection T is not equal to or less than the designated time (step S109: NO), control unit 6 sets the detection state of coordinates to the invalid state (D=3) (step S110). Then, the flow returns to step S101.

In a case where the indicator is the active pen (step S103: YES), control unit 6 validates the coordinates indicated in the coordinates information, and sets the detection state of coordinates to the valid state (D=2), and the detection state of indicator to the active pen detection state (P=2) (step S111).

Next to steps S108 and S111, control unit 6 starts tracing of the validated coordinates (hereinafter, referred to as validated coordinates) (step S112).

After starting the trace of the validated coordinates, in a case where the release of the validated coordinates (it may be mentioned as indicator) is detected (step S113: YES), control unit 6 sets the detection state of coordinates to the non-detection state (D=0) (step S116).

Meanwhile, after starting the trace of the validated coordinates, in a case where the release of the validated coordinates is not detected (step S113: NO), control unit 6 determines whether or not the detection state of indicator according to the validated coordinates being traced is in the detection state (P=1) other than the active pen and (coordinates indicated by) the active pen is recently detected (step S114).

As a determination result of step S114, in a case where P=1 and the active pen is not recently detected (step S114: NO), the flow returns to step S113.

Meanwhile, the determination result of step S114, in a case where P=1 and the active pen is recently detected (step S114: YES), control unit 6 invalidates the validated coordinates being traced, and sets the detection state of coordinates to the invalid state (D=3) (step S115). Then, the flow returns to step S111.

That is, in a case where the coordinates recently indicated by the active pen are detected when the coordinates indicated by an indicator other than the active pen traced by being validated, the coordinates indicated by an indicator other than the active pen become invalid and the coordinates recently indicated by the active pen become valid.

In a case where it is determined that D=3 in step S101 (step S101: YES) or after setting D=0 in step S116, control unit 6 determines whether or not the release of all of the validated coordinates is detected (step S117).

As a determination result of step S117, in a case where the release of all of the validated coordinates is not detected (step S117: NO), the flow returns to step S101.

Meanwhile, the determination result of step S117, in a case where the release of all of the validated coordinates is detected (step S117: YES), control unit 6 performs initialization of the coordinates management table (step S118). For example, control unit 6 sets values (D, P, T, X, Y, and Z) recorded in all of the serial numbers (i's=1 to 10) of the coordinates management table illustrated in FIG. 10 to zero.

By the initialization, a series of processes are terminated. The initialization may be performed before step S101.

So far, the operation example of electronic apparatus 1 is described.

According to the electronic apparatus 1 of the embodiment, in a case where the indicator is other than an active pen, in a state where the conductor such as water droplet and the like is continuously attached on the touch panel surface, coordinates immediately before (last) the detection of pressure by the operation by the bare hand and the glove are validated and previous coordinates thereof are not validated, thereby it is possible to further reliably perform an operation of the hand and the glove having a high possibility that it is done immediately before the pressure, and further prevent an erroneous detection that the attachment of water droplet or the like having a high possibility that it is before the operation is an operation. In addition, in a case where the indicator is the active pen, since the coordinates indicated by the active pen are valid regardless of a distortion detection result of glass 11, it is possible to prevent reduction of the operability of the active pen.

In addition, according to electronic apparatus 1 of the embodiment, in a case where coordinates recently indicated by the active pen are detected when the coordinates indicated by an indicator other than the active pen are traced by being validated, since the coordinates indicated by the active pen are validated with priority, it is possible to prevent reduction of the operability of the active pen.

So far, the embodiment is described. However, the present disclosure is not limited to the embodiment, and it is possible to implement various modifications without departing the scope of the present disclosure. Hereinafter, a modification example will be described.

Modification Example 1

Figure 12:
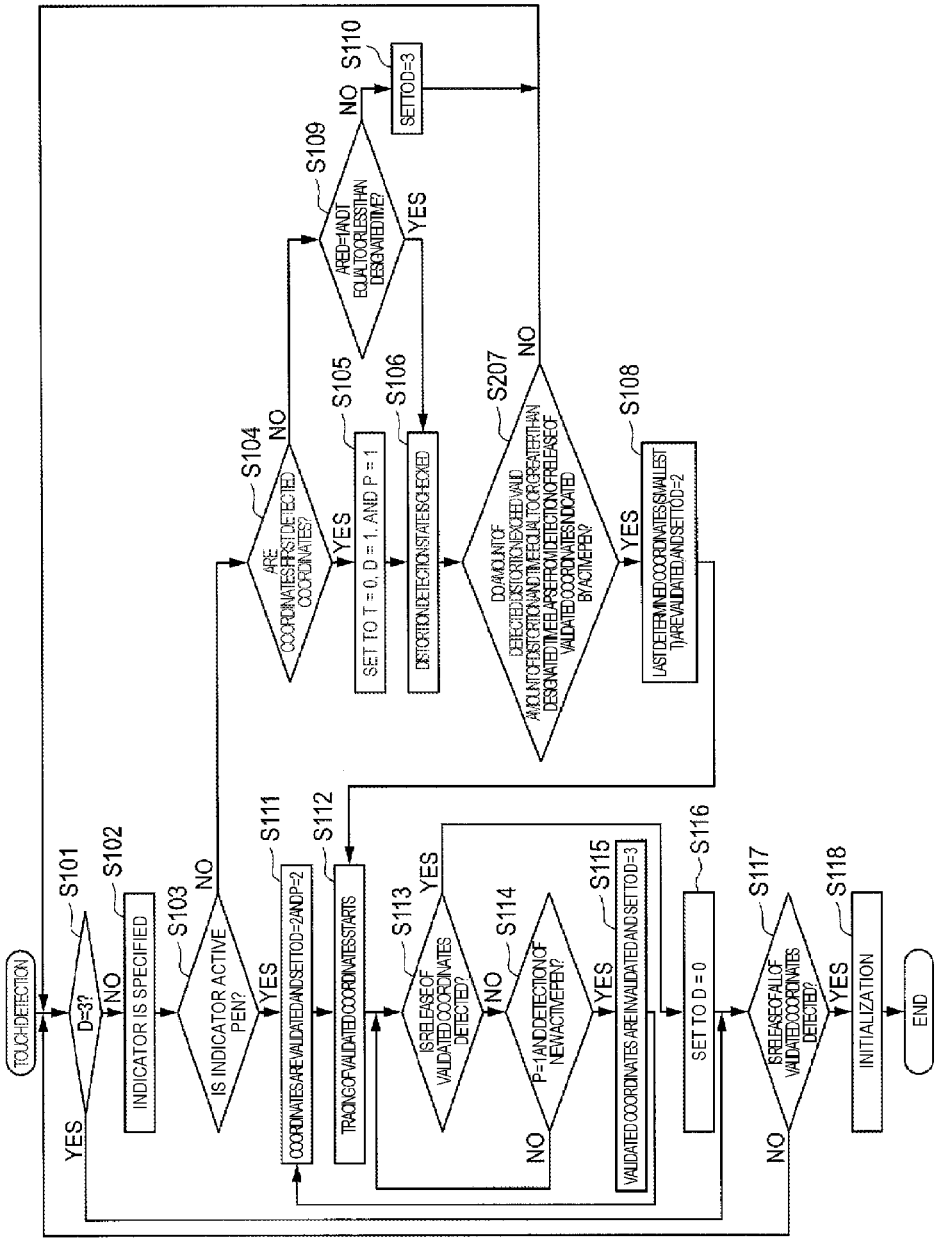
FIG. 12 is a flowchart illustrating another operation example of the electronic apparatus according to the embodiment.

In the embodiment, the operation example of electronic apparatus 1 is described by using a flow of FIG. 11. However, the operation example of electronic apparatus 1 may be a flow of an operation illustrated in FIG. 12. FIG. 12 is different from FIG. 11 in that step S207 is performed, instead of step S107 of FIG. 11.

In step S207, control unit 6 determines whether or not the amount of distortion detected by pressure sensor 3 exceeds the valid amount of distortion and a time equal to or greater than a designated time elapses from the detection of the release of the validated coordinates indicated by the active pen. Here, for example, the designated time is the same as the designated time described in step S109 of FIG. 11.

In a case where a determination result of step S207 is NO, the flow returns to step S101, and in a case where the determination result of step S207 is YES, the flow proceeds to step S108.

That is, after the coordinates indicated by the active pen are validated, in a case where the coordinates indicated by an indicator other than the active pen are detected, when a time equal to or greater than a designated time elapses from the detection of the release of the former coordinates and the amount of distortion equal to or greater than a valid amount of distortion is detected by pressure sensor 3, control unit 6 validates the latter coordinates.

For example, in a case where a finger or the like is touched on the touch panel surface during an operation of the active pen, when coordinates indicated by the finger or the like are validated immediately after the release of the active pen is detected, an unintended operation of an operator may occur. However, according to an operation example illustrated FIG. 12, it is possible to prevent such an operation.

Modification Example 2

In addition, in the embodiment, Disposition Example 1 of touch panel layer 2, pressure sensor 3, and display unit 4 is described by using FIG. 6 and FIG. 7.

However, the Disposition Example is not limited thereto. Hereinafter, each of Disposition Examples 2 to 10 other than Disposition Example 1 will be described with reference to the drawings.

Figure 13:
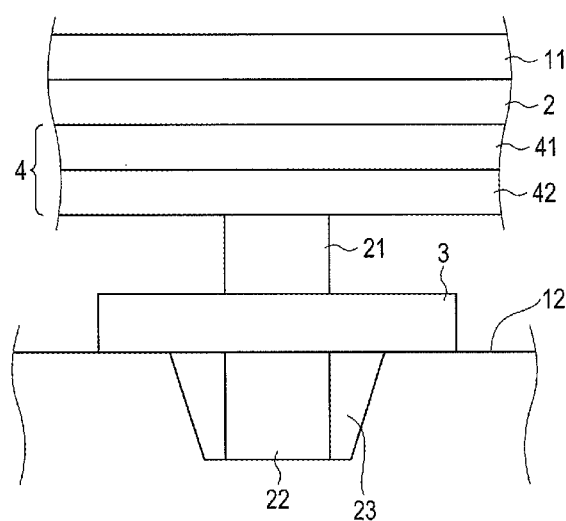
FIG. 13 is a diagram illustrating Disposition Example 2 of the glass, the touch panel layer, the pressure sensor, and the display unit in the electronic apparatus according to the embodiment.

FIG. 13 is a side sectional view of electronic apparatus 1 illustrating Disposition Example 2. As illustrated in FIG. 13, touch panel layer 2, display unit 4 (LCD 41 and backlight 42), pusher (plunger) 21, pressure sensor 3, and elastic member 22 are sequentially disposed under glass 11.

In FIG. 13, pusher 21 is disposed between backlight 42 and pressure sensor 3. An end of pusher 21 is in contact with a surface of backlight 42, and the other end of pusher 21 is fixed into a surface of pressure sensor 3. Recess portion 23 is formed in framework portion 12 (example of a part of housing 10) of housing 10. Elastic member 22 is provided in recess portion 23, an end thereof is fixed into the bottom of recess portion 23, and the other end thereof is fixed into a surface of pressure sensor 3 (rear surface of a surface to which pusher 21 is fixed). In addition, both ends of pressure sensor 3 are fixed to framework portion 12.

In a configuration of FIG. 13, when pressure is applied to glass 11 by being in contact with the finger of user (bare hand or gloved hand), pusher 21 pushes pressure sensor 3 to a downward direction (direction of recess portion 23). At this time, elastic member 22 shrinks so as to absorb pressure against pressure sensor 3. When the finger of user is separated from glass 11 and there is no pressure against glass 11, elastic member 22 returns to its original length by being extended. With this, pressure sensor 3 is pushed to an upward direction (direction of backlight 42).

An example of a disposition location of pressure sensor 3 in electronic apparatus 1 illustrated in FIG. 13 is illustrated in FIGS. 14A to 14C. Each of FIG. 14A, FIG. 14B, and FIG. 14C illustrates where pressure sensor 3 is disposed in the front surface of housing 10 of electronic apparatus 1. Pressure sensor 3 is in a rectangular shape, and considerably smaller than an area of pressure sensor 3 illustrated in FIG. 4 and FIG. 5.

FIG. 14A is an example in which pressure sensor 3 is disposed in the center of housing 10. As illustrated in FIG. 14A, pressure sensor 3 is disposed to implement a long side thereof in parallel with a short side of housing 10.

FIG. 14B is an example in which pressure sensor 3 is disposed in the center of housing 10. As illustrated in FIG. 14B, pressure sensor 3 is disposed to implement the long side thereof in parallel with the long side of housing 10. FIG.

14C is an example in which two pressure sensors 3 are disposed in the vicinity of the short sides of housing 10, respectively. As illustrated in FIG. 14C, two pressure sensors 3 are disposed to implement the long sides thereof in parallel with the short sides of housing 10, respectively.

Among three examples of FIGS. 14A to 14C, the disposition of pressure sensor 3 illustrated in FIG. 14A can detect the distortion best, and be implemented at a low cost. The disposition location and the number of pressure sensors 3 are not limited to the examples illustrated in FIGS. 14A to 14C. For example, four pressure sensors 3 may be disposed along four sides of housing 10.

Figure 15:
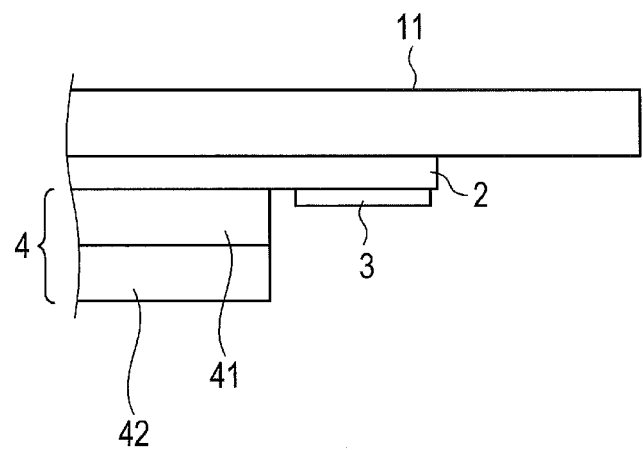
FIG. 15 is a diagram illustrating Disposition Example 3 of the glass, the touch panel layer, the pressure sensor, and the display unit in the electronic apparatus according to the embodiment.

FIG. 15 is a side sectional view of electronic apparatus 1 indicating Disposition Example 3. As illustrated in FIG. 15, touch panel layer 2 is disposed on a lower surface side of glass 11, and pressure sensor 3 is disposed on a peripheral portion of a lower surface side of touch panel layer 2. In addition, LCD 41 and backlight 42 as display unit 4 are disposed on the lower surface side of touch panel layer 2 and a location separated from pressure sensor 3. LCD 41 is disposed toward touch panel layer 2.

Figure 16:
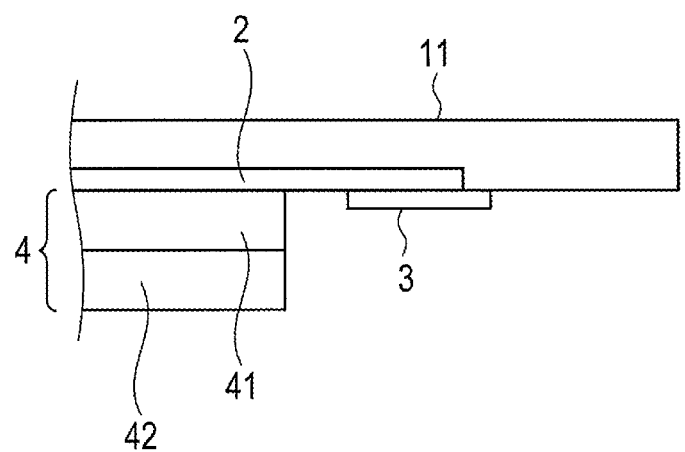
FIG. 16 is a diagram illustrating Disposition Example 4 of the glass, the touch panel layer, the pressure sensor, and the display unit in the electronic apparatus according to the embodiment.

FIG. 16 is a side sectional view of electronic apparatus 1 indicating Disposition Example 4. As illustrated in FIG. 16, touch panel layer 2 is disposed by being fitted into the lower surface side of glass 11. That is, glass 11 and touch panel layer 2 are integrated. Pressure sensor 3 is disposed over glass 11 and touch panel layer 2 on the lower surface side of glass 11 and touch panel layer 2. Display unit 4 is disposed similar to Disposition Example 3 illustrated in FIG. 15.

Figure 17:
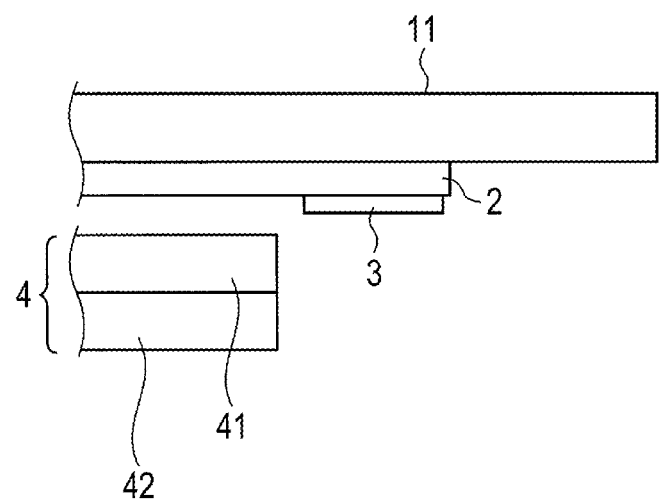
FIG. 17 is a diagram illustrating Disposition Example 5 of the glass, the touch panel layer, the pressure sensor, and the display unit in the electronic apparatus according to the embodiment.

FIG. 17 is a side sectional view of electronic apparatus 1 indicating Disposition Example 5. Disposition Example 5 illustrated in FIG. 17 is basically the same as Disposition Example 3 illustrated in FIG. 15. A different point is that touch panel layer 2 and LCD 41 of display unit 4 are disposed at a certain distance.

Figure 18:
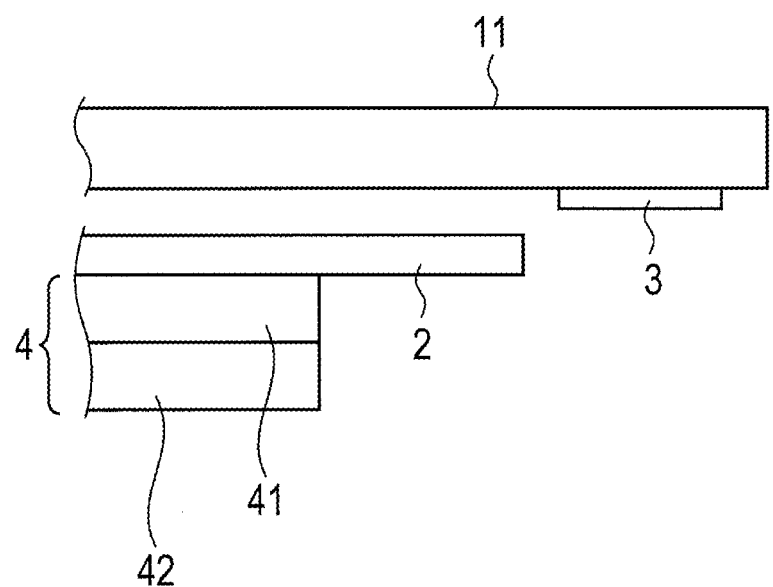
FIG. 18 is a diagram illustrating Disposition Example 6 of the glass, the touch panel layer, the pressure sensor, and the display unit in the electronic apparatus according to the embodiment.

FIG. 18 is a side sectional view of electronic apparatus 1 indicating Disposition Example 6. As illustrated in FIG. 18, pressure sensor 3 is disposed on a peripheral portion of the lower surface side of glass 11. Touch panel layer 2 is disposed at a location on a lower portion of glass 11 and separated from glass 11 at a certain distance. Display unit 4 is disposed similar to Disposition Example 3 illustrated in FIG. 15.

In a case of Disposition Example 5 of FIG. 17 and Disposition Example 6 of FIG. 18, it is possible to separate display unit 4 and glass 11 (example: 5 mm to 15 mm) from each other. For example, in a case where glass 11 has some unevenness or a slight curvature, it is valid when display unit 4 is hard and is implemented to avoid contact with the unevenness of glass 11 or the like. In addition, it is also possible to dispose display unit 4 in an inner portion of a side surface (for example, door or the like) of refrigerator, and dispose glass 11 having a slight curvature on a side surface of a location corresponding to display unit 4. In addition, it is also possible to set the glass (glass included in building) of a show window as glass 11 by disposing display unit 4 of a large screen (for example, 50-inch) in the show window.

Figure 19:
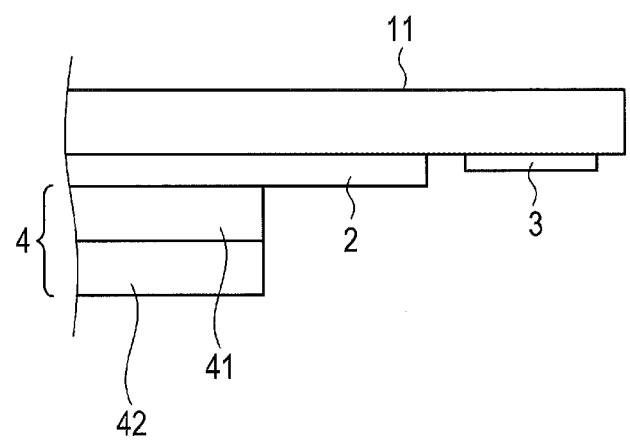
FIG. 19 is a diagram illustrating Disposition Example 7 of the glass, the touch panel layer, the pressure sensor, and the display unit in the electronic apparatus according to the embodiment.

FIG. 19 is a side sectional view of electronic apparatus 1 indicating Disposition Example 7. Disposition Example 7 illustrated in FIG. 19 is basically the same as Disposition Example 6 illustrated in FIG. 18. A different point is that touch panel layer 2 and glass 11 are disposed at a certain distance.

Figure 20:
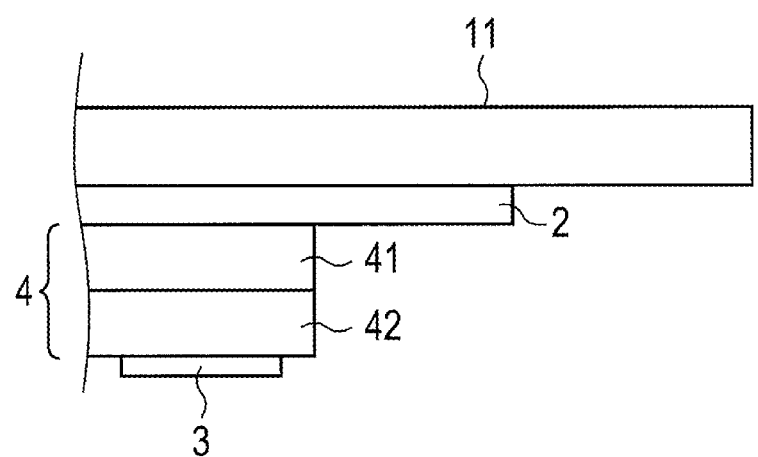
FIG. 20 is a diagram illustrating Disposition Example 8 of the glass, the touch panel layer, the pressure sensor, and the display unit in the electronic apparatus according to the embodiment.

FIG. 20 is a side sectional view of electronic apparatus 1 indicating Disposition Example 8. Disposition Example 8 illustrated in FIG. 20 is basically the same as Disposition Example 3 illustrated in FIG. 15. A different point is that pressure sensor 3 is not disposed on the lower surface side of touch panel layer 2, and disposed on a lower surface side of backlight 42. Pressure sensor 3 may be disposed on an upper surface side of any one of LCD 41 and backlight 42, on a side surface side of any one of LCD 41 and backlight 42, on an inner portion of any one of LCD 41 and backlight 42.

Figure 21:
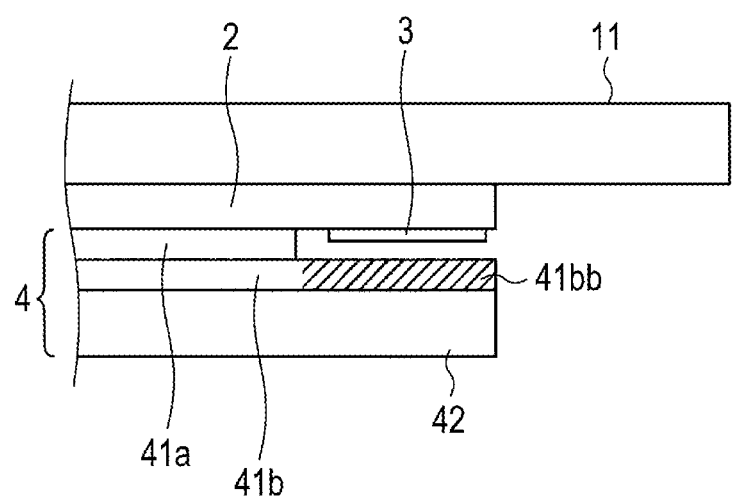
FIG. 21 is a diagram illustrating Disposition Example 9 of the glass, the touch panel layer, the pressure sensor, and the display unit in the electronic apparatus according to the embodiment.

FIG. 21 is a side sectional view of electronic apparatus 1 indicating Disposition Example 9. As illustrated in FIG. 21, display unit 4 includes at least planar transparent member 41a and transparent member 41b disposed to overlap transparent member 41a, and a liquid crystal is pinched between transparent member 41a and transparent member 41b.

In addition, as illustrated in FIG. 21, transparent member 41a is disposed on a lower surface side of touch panel layer 2, and transparent member 41b is disposed on a lower surface side of transparent member 41a. In addition, a part of transparent member 41b is protruded outward more than transparent member 41a on end portion 41bb of display unit 4. Pressure sensor 3 is disposed on a portion corresponding to protruded end portion 41bb of transparent member 41b, on the lower surface side of touch panel layer 2.

According to such Disposition Example 9, since pressure sensor 3 is disposed on the portion corresponding to protruded end portion 41bb of transparent member 41b, a new space for disposing pressure sensor 3 is not required, and it is possible to more effectively use a space inside electronic apparatus 1.

Figure 22:
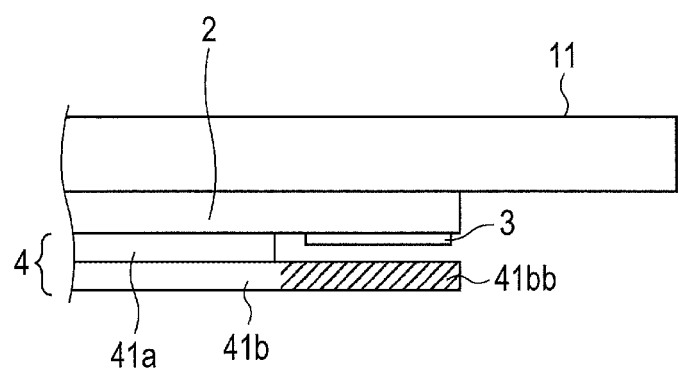
FIG. 22 is a diagram illustrating Disposition Example 10 of the glass, the touch panel layer, the pressure sensor, and the display unit in the electronic apparatus according to the embodiment.

FIG. 22 is a side sectional view of electronic apparatus 1 indicating Disposition Example 10. Disposition Example 10 illustrated in FIG. 22 is basically the same as Disposition Example 9 illustrated in FIG. 21. A different point is that backlight 42 is not included. Accordingly, in this case, display unit 4 is implemented as a configuration (for example, organic electroluminescence (EL)) which can perform image display without requiring the backlight.

In Disposition Example 10, similar to Disposition Example 9, since pressure sensor 3 is disposed on the portion corresponding to protruded end portion 41bb of transparent member 41b, a new space for disposing pressure sensor 3 is not required, and it is possible to more effectively use a space inside electronic apparatus 1.

So far, Disposition Examples 2 to 10 are described.

Modification Example 3

In electronic apparatus 1 of the embodiment, in a case where pressure sensor 3 does not detect distortion when touch panel layer 2 determines two-dimensional coordinates, it is also possible for control unit 6 to determine that the conductor such as water droplet and the like is attached on the touch panel surface. In this case, for example, control unit 6 may be also controlled to display the display indicating a determination result on display unit 4.

Modification Example 4

In addition, a program causing electronic apparatus 1 to execute an operation illustrated in the flowchart of FIG. 11 and/or FIG. 12 may be also stored in the ROM (not illustrated) of control unit 6, and may be also stored in a storage unit outside electronic apparatus 1. As an example of the storage unit outside electronic apparatus 1, a storage medium such as a magnetic disk, an optical disk, a magneto-optical disk, and a flash memory and the like, a server on a network such as the Internet and the like, or the like is mentioned.

Modification Example 5

In addition, electronic apparatus 1 of the embodiment is applied to a potable terminal such as a smartphone and a tablet. However, electronic apparatus 1 is not limited to the potable terminal. For example, electronic apparatus 1 can be also applied to a home appliance (for example, microwave ovens, refrigerators, or the like), a car navigation system, a home energy management system (HEMS), a building energy management system (BEMS), or the like.

So far, modification examples are described. The modification examples are appropriately combined.

It is also possible to grasp electronic apparatus 1 or the like according to the embodiment described above in the following manner.

1-1

An electronic apparatus includes a housing; a display unit that is disposed inside the housing, and displays predetermined information; a capacitive touch panel unit that transmits display of the display unit, and detects coordinates indicated by an indicator separated from a surface in a predetermined distance; a transparent member that protects the touch panel unit, and transmits the display of the display unit; a pressure detection unit that detects distortion of the transparent member; and a control unit that validates or invalidates the coordinates detected by the touch panel unit, in which the control unit validates the coordinates detected by the touch panel unit, in a case where the indicator is an active pen, and the control unit validates the coordinates most recently detected by the touch panel unit when distortion of a predetermined amount is detected by the pressure detection unit in a case where the indicator is other than an active pen.

According to the electronic apparatus of 1-1, in a case where the indicator is other than an active pen (for example, bare hand, glove, passive pen, or the like), in a state where a conductor such as water droplet or the like is continuously attached on the touch panel surface, coordinates immediately before (last) the detection of pressure by the operation by the bare hand or the like are validated and previous coordinates thereof are not validated, thereby it is possible to further reliably perform an operation of the hand and the glove having a high possibility that it is done immediately before the pressure, and further prevent an erroneous detection that the attachment of water droplet or the like having a high possibility before the operation is an operation. In addition, according to the electronic apparatus of 1-1, in a case where the indicator is the active pen, since the coordinates indicated by the active pen are validated regardless of a detection result of distortion of the transparent member, it is possible to prevent the reduction of operability of the active pen.

1-2

In the electronic apparatus according to 1-1, from validation of first coordinates indicated by the indicator other than the active pen to detection of release of the first coordinates, in a case where second coordinates indicated by an active pen are recently detected, the control unit invalidates the first coordinates, and validates the second coordinates.

According to the electronic apparatus of 1-2, since the coordinates indicated by the active pen are validated with priority, it is possible to prevent the reduction of the operability of the active pen.

1-3

In the electronic apparatus according to 1-1 or 1-2, after third coordinates indicated by the active pen are validated, in a case where fourth coordinates indicated by the indicator other than the active pen are detected, when a predetermined time elapses from the detection of the release of the third coordinates and a predetermined amount of distortion is detected by the pressure detection unit, the control unit validates the fourth coordinates.

For example, in a case where a finger or the like is touched on the touch panel surface during an operation of the active pen, when the coordinates indicated by the finger or the like immediately after the release of the active pen is detected are valid, an unintended operation of an operator may occur. However, it is possible to prevent such an operation according to the electronic apparatus of 1-3.

1-4

A coordinates detection method used in an electronic apparatus including a housing, a display unit that is disposed inside the housing, and displays predetermined information, a capacitive touch panel unit that transmits display of the display unit, and detects coordinates indicated by an indicator separated from a surface in a predetermined distance, a transparent member that protects the touch panel unit, and transmits the display of the display unit, a pressure detection unit that detects distortion of the transparent member, and a control unit that validates or invalidates the coordinates detected by the touch panel unit, the method including validating the coordinates detected by the touch panel unit in a case where the indicator is an active pen; and validating the coordinates most recently detected by the touch panel unit, when a predetermined amount of distortion is detected by the pressure detection unit, in a case where the indicator is other than an active pen.

According to the coordinates detection method of 1-4, in a case where the indicator is other than an active pen (for example, bare hand, glove, passive pen, or the like), in a state where a conductor of water droplet or the like is continuously attached on the touch panel, coordinates immediately before (last) the detection of pressure by the operation by the bare hand and the glove are validated and previous coordinates thereof are not validated, thereby it is possible to further reliably perform an operation of the bare hand and the glove having a high possibility that it is done immediately before the pressure, and to further prevent erroneous detection that attachment of water droplets having a high possibility before the operation is an operation. In addition, according to the coordinates detection method of 1-4, in a case where the indicator is the active pen, since the coordinates indicated by the active pen are validated regardless of a detection result of distortion of the transparent member, it is possible to prevent the reduction of operability of the active pen.

The disclosure is useful for a technology (for example, apparatus, system, method, program, or the like) using the capacitive touch panel.

What is claimed is:

1. An electronic apparatus comprising:
    a housing;
    a display unit that is disposed inside the housing, and displays predetermined information;
    a capacitive touch panel unit that transmits a display of the display unit, and detects coordinates indicated by an indicator separated from a surface in a predetermined distance;
    a transparent member that protects the capacitive touch panel unit, and transmits the display of the display unit;
    a pressure detection unit that detects distortion of the transparent member; and a control unit that validates or invalidates the coordinates detected by the capacitive touch panel unit, wherein the control unit validates the coordinates detected by the capacitive touch panel unit, in a case where the indicator is an active pen, and the control unit validates the coordinates most recently detected by the capacitive touch panel unit when distortion of a predetermined amount is detected by the pressure detection unit and a time equal to or greater than a designated time elapses, in a case where the indicator is other than an active pen.

2. The electronic apparatus of claim 1, wherein from validation of first coordinates indicated by the indicator other than the active pen to detection of release of the first coordinates, in a case where second coordinates indicated by an active pen are recently detected, the control unit invalidates the first coordinates, and validates the second coordinates.

3. The electronic apparatus of claim 1, wherein after third coordinates indicated by the active pen are validated, in a case where fourth coordinates indicated by the indicator other than the active pen are detected, when a predetermined time elapses from the detection of the release of the third coordinates and a predetermined amount of distortion is detected by the pressure detection unit, the control unit validates the fourth coordinates.

4. A coordinates detection method used in an electronic apparatus including a housing, a display unit that is disposed inside the housing, and displays predetermined information, a capacitive touch panel unit that transmits a display of the display unit, and detects coordinates indicated by an indicator separated from a surface in a predetermined distance, a transparent member that protects the capacitive touch panel unit, and transmits the display of the display unit, a pressure detection unit that detects distortion of the transparent member, and a control unit that validates or invalidates the coordinates detected by the capacitive touch panel unit, the method comprising:

validating the coordinates detected by the capacitive touch panel unit in a case where the indicator is an active pen; and validating the coordinates most recently detected by the capacitive touch panel unit, when a predetermined amount of distortion is detected by the pressure detection unit and a time equal to or greater than a designated time elapses, in a case where the indicator is other than an active pen.

* * * * *